United States Patent [19]

Samejima et al.

[11] Patent Number: 5,062,258

[45] Date of Patent: * Nov. 5, 1991

[54] TERRAIN TRAVERSING APPARATUS HAVING MEANS FOR TRANSFERRING GRASS CLIPPINGS TO COLLECTION BOX

[75] Inventors: Kazuo Samejima; Hiroaki Kawakita, both of Osaka, Japan

[73] Assignee: Kubota LTD, Osaka, Japan

[ * ] Notice: The portion of the term of this patent subsequent to Jun. 26, 2007 has been disclaimed.

[21] Appl. No.: 889,364

[22] Filed: Jul. 25, 1986

[30] Foreign Application Priority Data

Aug. 13, 1985 [JP] Japan .................................. 60-178313
Jan. 23, 1986 [JP] Japan .................................. 61-13403

[51] Int. Cl.⁵ ...................... A01D 34/63; A01D 87/10
[52] U.S. Cl. ......................................... 56/202; 56/13.3
[58] Field of Search ..................... 56/202, 16.6, 12.7, 56/13.3, 320.2

[56] References Cited

U.S. PATENT DOCUMENTS

| 3,402,536 | 9/1968 | Hale et al. | 56/DIG. 22 |
| 3,583,134 | 6/1971 | Kemper | 56/13.3 |
| 3,657,865 | 4/1972 | Ober | 56/320.2 |
| 3,906,709 | 9/1975 | Rhodes | 56/13.3 |
| 3,925,968 | 12/1975 | Wagenhals | 56/13.3 |
| 3,974,629 | 8/1976 | Russel et al. | 56/320.2 |
| 4,114,353 | 9/1978 | Ansbaugh et al. | 56/13.3 |
| 4,188,160 | 2/1980 | Corbett et al. | 56/13.3 |
| 4,304,141 | 12/1981 | Towe et al. | 56/DIG. 22 |
| 4,321,783 | 3/1982 | Kawasaki et al. | 56/DIG. 22 |
| 4,614,080 | 9/1986 | Hoepfuer et al. | 56/13.3 |
| 4,621,699 | 11/1986 | Slazas | 56/DIG. 22 |

FOREIGN PATENT DOCUMENTS 1251570 10/1969 Fed. Rep. of Germany ....... 56/13.3

Primary Examiner—John G. Weiss

[57] ABSTRACT

A two-axle four-wheel power vehicle is equipped between the front and rear wheels with a mower which comprises a plurality of cutters each rotatable about a vertical axis. The cutters are power-driven, and the clippings of grass thereby cut are discharged from an opening provided at one side of the vehicle body. The discharge opening is provided with an impeller power-driven about a lateral axis for transferring the discharged grass clippings through a duct to a collection box attached to the vehicle.

8 Claims, 4 Drawing Sheets

5,062,258

TERRAIN TRAVERSING APPARATUS HAVING MEANS FOR TRANSFERRING GRASS CLIPPINGS TO COLLECTION BOX

FIELD OF THE INVENTION AND RELATED ART STATEMENT

The present invention relates to a terrain traversing apparatus comprising a mower and a collection box which are mounted on a ground running power vehicle for cutting grass or the like by the cutter of the power and accommodating the clippings in the collection box.

U.S. Pat. No. 4,114,353, already disclose terrain traversing device which comprise a mower mounted on a two-axle four-wheel power vehicle under the vehicle body between the front and rear wheels and which is adapted for collecting the clippings of grass cut by the cutter of the mower in a bag by transfer means through a duct.

The device of the above patent in particular includes an impeller disposed at one side of the mower deck and opposed to a discharge opening of the mower. Through a belt, the impeller is driven by the power delivered from a transmission for driving the mower cutter. Since the impeller is positioned in close proximity to the discharge opening, the grass clippings can be effectively forced into the collection bag.

However, the device has the following drawbacks since the belt drives the impeller about a vertical axis. The belt is reeved around pulleys, therefore undergoing marked fatigue and is liable to damage early. The impeller, which is heavily loaded, not only reduces the durability of the belt but also adversely affects the operation of the cutter.

The blades of the impeller revolve around the vertical axis and therefore impede the flow of clippings cut off by the cutter and discharged, further resulting in the drawback of necessitating an impeller housing greatly projecting laterally outward. Further because the impeller housing has a flat bottom plate, the housing has difficulty in smoothly moving along the ground, possibly cutting raised portions of the ground with its front edge.

OBJECTS AND SUMMARY OF THE INVENTION

A first object of the present invention is to use a transmission shaft for driving an impeller for transporting grass clippings to a collection box with power dividedly delivered from a cutter drive assembly so as to assure the transmission of torque more accurately and reliably than when a belt is used.

A second object of the present invention is to drive the impeller through a transmission shaft branching from the cutter drive assembly and to render the impeller drivingly rotatable about a horizontal lateral axis, thereby reducing the amount of lateral outward projection of the impeller and enabling the impeller to draw in the grass clippings axially thereof and discharge the clippings tangentially thereof, so that the clippings will flow through the discharge portion smoothly with a reduced likelihood of jamming.

A third object of the present invention is to use the above transmission shaft branching from the cutter drive assembly for rotating the impeller about the lateral axis, along with a universal joint provided at a lengthwise intermediate portion of the transmission shaft for absorbing the load on the impeller and reducing the likelihood that the rotation of the cutter will involve irregularities.

A fourth object of the present invention is to accommodate the impeller, which is rotatable about the lateral axis, in a housing having a circular configuration in side elevation where it is opposed to the ground, the impeller housing thus being adapted to smoothly follow the undulations of the ground with a reduced likelihood of cutting raised portions of the ground.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled inn the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
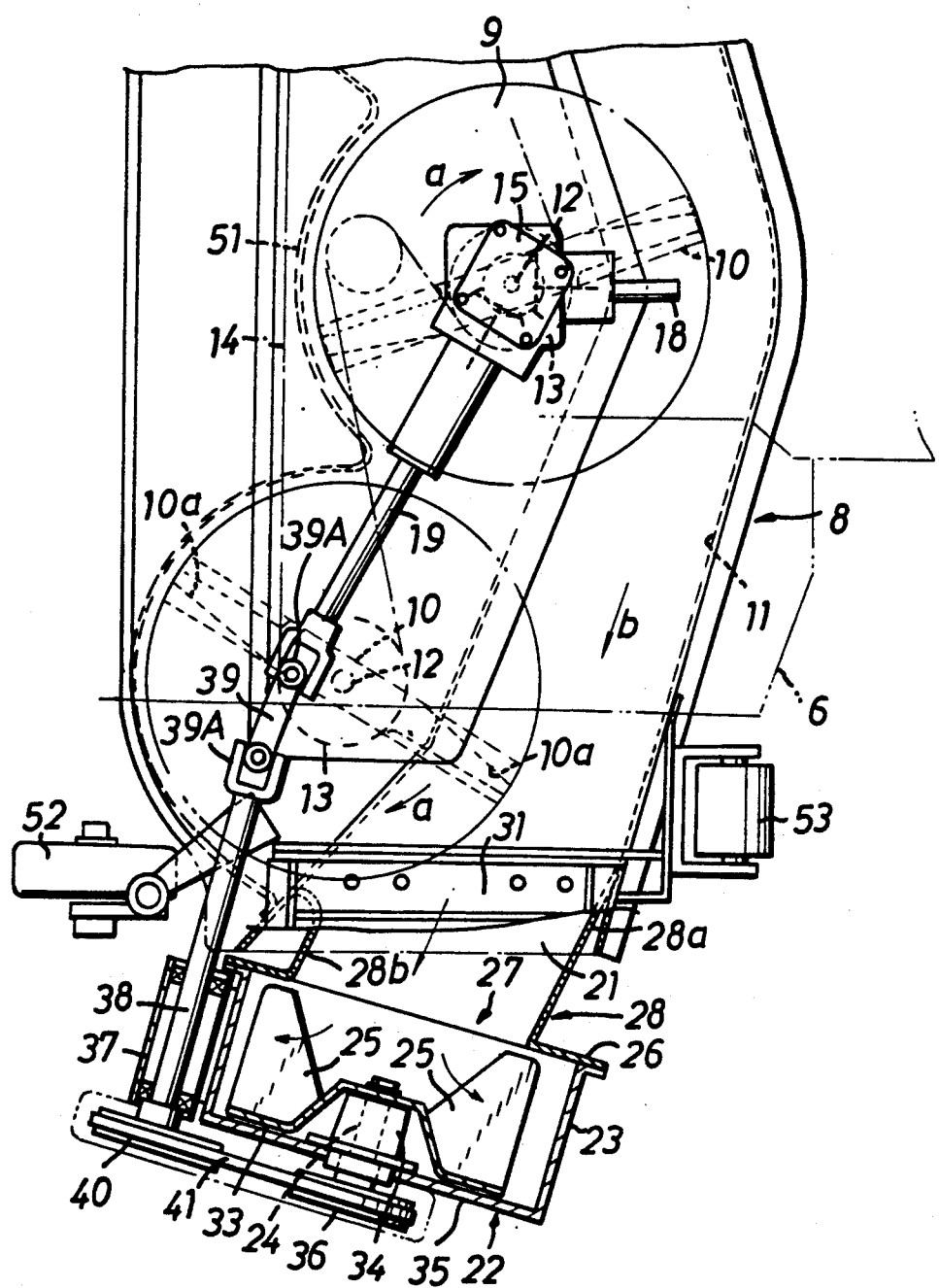
FIG. 1 is a plan view partly broken away of the present invention.

Embodiments of the present invention will be described below with reference to the drawings, in which like parts are designated by like reference numerals.

Figure 6:
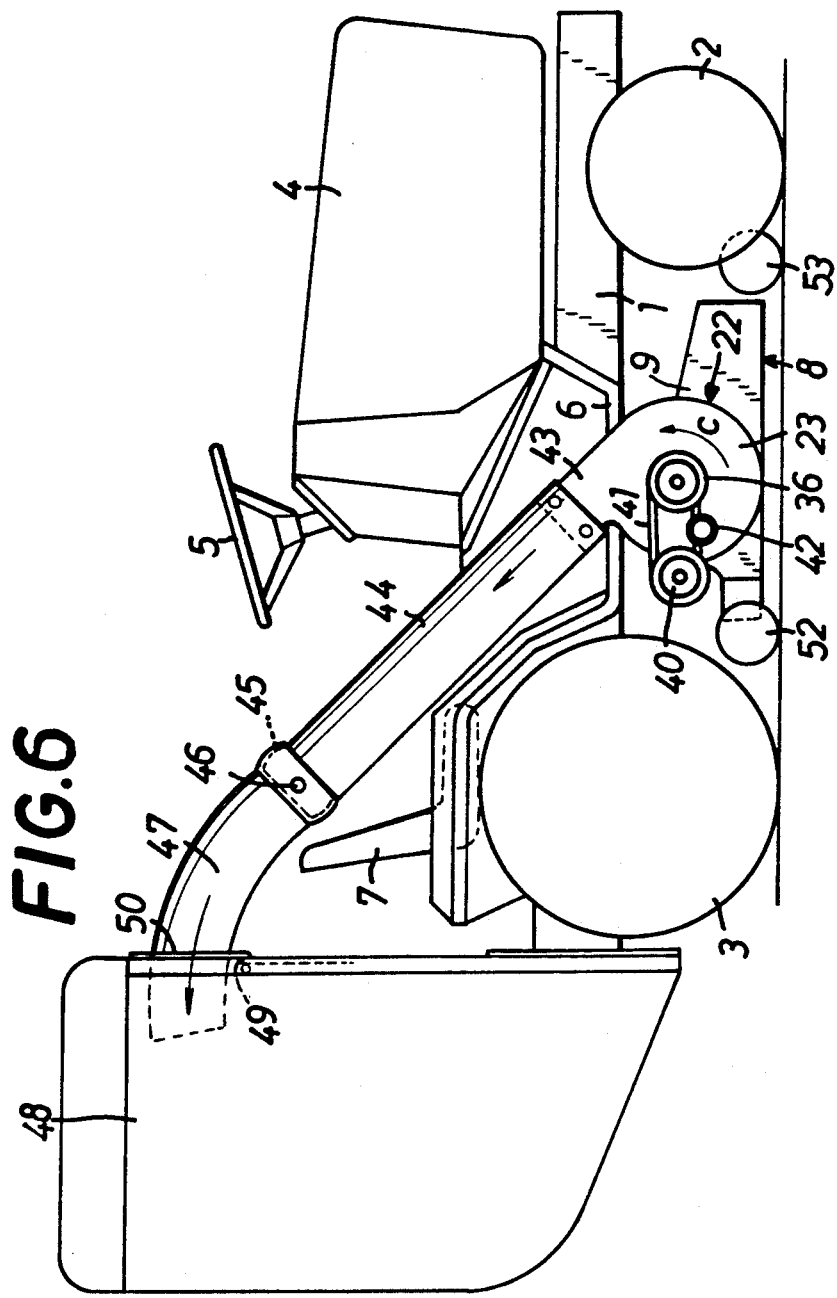
FIG. 6 is an overall side elevation of the present invention.

Referring to FIG. 6 the overall construction, the present invention is shown. A running power vehicle is shown with front wheels 2 and rear wheels 3 on the vehicle body 1 and is therefore of the two-axle four-wheel type. The vehicle is a riding type and has a bonnet 4, a steering wheel 5, steps 6 and a seat 7.

A mower 8 is vertically movably attached to the bottom of the vehicle body 1 between the front and rear wheels 2, 3 by unillustrated parallel link means or the like. A collection box 48 is provided at the rear of the seat 7.

Figure 2:
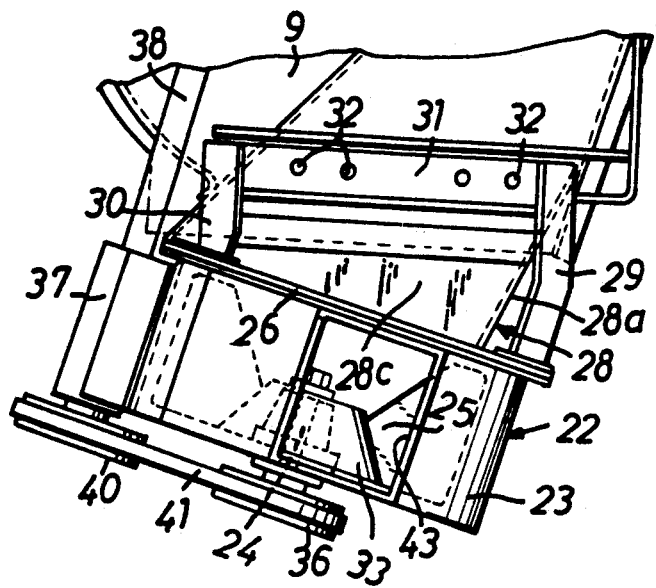
FIG. 2 is a fragmentary plan view of the present invention.
Figure 3:
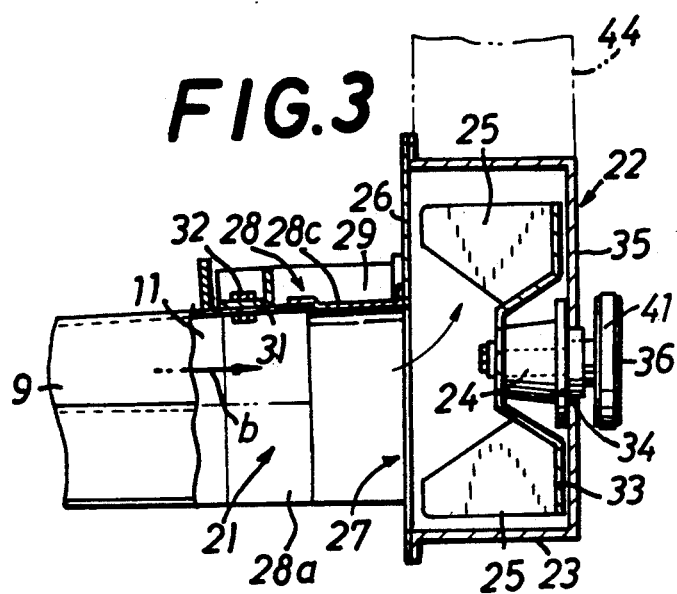
FIG. 3 is a rear view partly broken away of the present invention.
Figure 4:
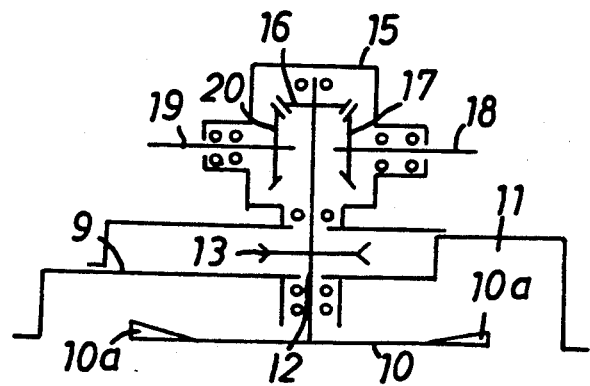
FIG. 4 is a diagram showing a power system of the present invention.

As seen in FIGS. 1 to 3, the mower 8 comprises cutters 10 mounted at the center and opposite sides of a mower deck 9. The mower deck 9 is generally V-shaped when seen from above, projecting forward at its central front portion. A clipping passage 11 projecting upward as shown in FIG. 4 is provided along the front wall of the deck. The cutters 10 are supported on the mower deck 9, each rotatably by a vertical shaft 12. The cutter shaft 12 disposed centrally of the deck 9 drivingly rotates the cutters 10 by means of pulleys 13 and a belt 14.

Thus, at least two cutters are arranged side by side at a spacing transversely of the direction of advance of the vehicle. In the illustrated case, three cutters 10 are provided at the center and opposite sides.

The cutter shaft 12 at the center is inserted in and supported by a transmission case 15 and operatively connected to an input shaft 18 by bevel gears 16, 17 within the case 15 as shown in FIG. 4. Thus, the central cutter 10 is driven directly by the cutter shaft 12. The other cutters 10 are driven by the belt 14 reeved around the pulleys 13 mounted on their shafts 12.

The input shaft 18 extends in the direction of working travel of the vehicle and is operatively connected to a front PTO shaft at the front of the body 1 by an unillustrated joint. For illustration purposes, the drive arrangement for input shaft 18 has been indicated in FIG. 1 by a power input means 18a. The transmission case 15 has a power takeoff shaft 19 extending therefrom laterally rearward and operatively connected to the bevel gear 16 by a bevel gear 20.

Thus, the input shaft 18 provides power input means, while the bevel gears 16, 17 constitute a cutter drive assembly. The torque delivered from the input means is divided by the bevel gear 20 in mesh with the bevel gear 16 into two portions, one for driving the cutters and the other for driving the impeller means to be stated below.

Figure 5:
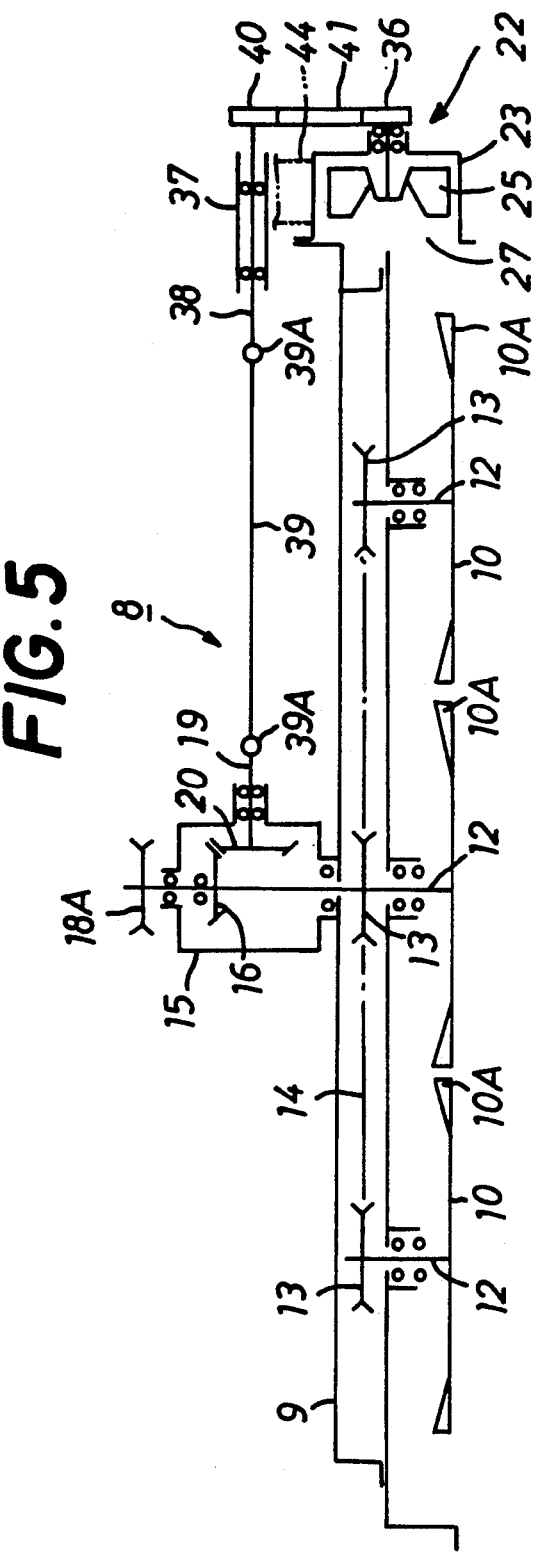
FIG. 5 is a diagram showing another power system of the present invention.

Alternatively, the power input means can be provided by a pulley 18A mounted on the central cutter shaft 12 as seen in FIG. 5 and a belt reeved around the pulley 18A.

The grass clippings cut off by the cutters and lifted by an air current produced by portions 10a are directed through the clipping passage 11 to a discharge opening 21 at one side of the mower deck 9. Impeller means 22 wherein the impeller is rotatable about a horizontal lateral axis is opposed to the discharge opening 21.

The impeller means 22 has a housing 23 which is generally circular when seen sideways and blades 25 provided within the housing 23 and supported by a horizontal lateral shaft 24.

As shown in FIGS. 2 and 3, the housing 23 has an inner side plate 26 which is formed at its lower portion with an inlet 27 in communication with the discharge opening 21. The inner side plate 26 has attached thereto a guide plate 28 inverted U-shaped in section, surrounding the inlet 27 and projecting toward the discharge opening 21. The guide plate 28 includes front and rear walls 28a, 28b bearing from inside against the front and rear walls defining the discharge opening 21 and a top wall 28c bearing from above on the top wall defining the opening 21. A frame 31 extending longitudinally of the vehicle body is connected to the inner side plate 26 by a pair of front and rear support brackets 29, 30. The frame 31 is removably fastened to the power deck 9 by four bolts 32.

The blades 25 are attached to a flange 33 as arranged radially. As shown in FIG. 3, the blade assembly defines at the inlet side thereof an inlet space diametrically increasing toward the inlet 27 so that the clippings from the discharge opening 21 can be readily admitted into the housing 23. The flange 33 is attached to the lateral shaft 24 to provide an impeller. The lateral shaft 24 is rotatably supported by a bearing case 34 on the outer side plate 35 of the housing 23. The shaft 24 carries a pulley 36 at its outer end. A power receiving shaft 38 parallel with the lateral shaft 24 is supported by a bearing case 37 at a rear portion of the housing 23. The power receiving shaft 38 is operatively connected to the power takeoff shaft 19 by a transmission shaft 39 having universal joints 39A. The shaft 38 is also operatively connected to the pulley 36 by a pulley 40 and a belt 41, whereby drive means is provided for the impeller. As seen in FIG. 6, a tension pulley 42 is biased into contact with the belt 41.

Further as seen in FIG. 6, the housing has at its upper side an outlet 43 oriented rearwardly upward at an angle of about 45 degrees tangentially of the housing 23. A straight duct 44 is attached to the outlet 43. A delivery duct 47 is pivotably connected to the upper end of the duct 44 by a ball join portion 45 and a pin 46. The delivery duct 47 is curved parabolically, loosely inserted in an opening 49 of the collection box 48 and idly movably supported by a rubber plate 50 on the box 48. The mower 8 has in the rear of the cutters 10 a guide plate having circular arc portions each along the locus of rotation of the cutter blade and is provided with gauge wheels 52 for adjusting the grass cutting level and limit gauge wheels 53.

According to the embodiment shown in FIGS. 1 and 4, the transmission 39 has a short length. As seen in FIG. 5, however, the pulley 18A may serve as the power input means, and an elongated transmission shaft 39 may be connected to short power takeoff shaft 19 and power receiving shaft 38 by universal joints 39A splined to these shafts.

While the bevel gears 16, 17 provide the cutter drive assembly, the bevel gear 16 may be positioned under the bevel gears 17, 20 in mesh therewith.

When the apparatus described above is used for cutting grass or the like, the cutters 10 of the mower 8 are rotated by the cutter drive assembly and belt transmission means about their vertical shafts 12 in the direction of arrows a in FIG. 1 to cut grass with the cutters 10, while lifting the clippings by an air current produced by the portions 10a of the cutters 10 and directing the clippings toward the discharge opening 21 through the passage 11 in the direction of arrow b.

On the other hand, the cutter drive assembly within the transmission case 15 dividedly delivers a torque to the power takeoff shaft 19 for driving the impeller. The torque is delivered from the shaft 19 to the lateral shaft 24 via the transmission shaft 39 having the universal joints 39A, power receiving shaft 38, pulleys 40, 36, belt 41, etc. to drive the blades 25 of the impeller means 22 about the shaft 24 in the direction of arrow c in FIG. 6. Thus, the impeller 22 operates during mowing, whereby the clippings are drawn in, thrown upward by the blades 25 and forced into the collection box 48 through the ducts 44, 47. More specifically, when the blades 25 are revolved, the clippings sent to the discharge opening 21 of the passage 11 are drawn via the inlet 27 into the housing 23 revolved along the inner periphery of the housing 23 by being thrown upward by the blades 25, discharged from the outlet 43 and sent into the collection box 48 via the ducts 44, 47. Thus, the clippings can be collected simultaneously with mowing.

The impeller 22, which has a lateral axis, axially draws in the clippings forwarded via the passage 11 and throws them upward with its blades 25, permitting the clippings to flow smoothly without accumulating at the discharge opening 21 or the inlet 27. Since the clippings axially drawn in are thrown up by the blades 25 and discharged from the outlet 433 tangentially of the housing 23, the clippings will not be restrained by the orientation of the outlet 43. As a result, the ducts 44, 47 can be inclined or curved in conformity with the position of the collection box 48 and can therefore be designed to facilitate the flow of clippings. The impeller 22 can be of a small axial dimension, so that the impeller of the lateral axis type can be installed with a reduced amount of laterally outward projection. This permits mowing operation in the vicinity of obstacles in the closest proximity thereof to minimize the unmowable area.

When the vehicle body 1 travels during mowing, the impeller 22 moves up and down along with the mower 8 following the ground surface. At this time, the housing 23, which is circular at its lower portion, will not cut the soil even at raised ground portion but smoothly follows the ground. When the impeller 22 moves upward and downward, the duct 44 supported by the impeller means also moves similarly. However, since the duct 44 is connected to the delivery duct 47 by the ball joint portion 45 and the pin 46, the ducts 44, 47 flex about the pin 46, while the delivery duct 47 is supported on the collection box 48 by means of rubber plate 50 and is pivotally movable. Consequently, the ducts will not restrain the movement of the impeller 22. The duct 47 is parabolically curved and therefore assures very smooth flow of the clippings.

Even if heavily loaded, the blades 25 can be resolved properly through the transmission shaft 39. The load is partially absorbed by the universal joints 39A of the transmission shaft 339, so that the cutters 10 can be driven free of any adverse effect.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A terrain travelling vehicle comprising:
  a mower including a deck, a mower assembly having meshing bevel gears, and mower cutters, said deck having forward, rearward and two side portions, said mower cutters being driven by said mower assembly to cut grass and the like to form clippings, said mower cutters being set in said deck and being rotatable about a vertical shaft, said deck having an opening in at least one side thereof, for discharge of clippings;
  a collection box for storing said clippings;
  a housing connected to said discharge opening of said deck, said housing having an inner side and an outer side, said inner side having an inlet for receiving said clippings from said mower and an outlet for discharge of said clippings from said housing;
  a duct assembly connecting said outlet of said housing to said collection box;
  an impeller mounted within said housing, said impeller including a plurality of blades which are rotatable about and driven by a horizontal shaft such that rotation of said blades of said impeller moves said clippings from said inlet to said outlet of said housing and then moves said clippings through said duct assembly to said collection box, said horizontal shaft being mounted through said outer side of said housing such that said inlet is free of obstructions which may tend to clog clippings inn said housing;
  power input means for driving at least said mower assembly;
  an input shaft located between said power input means and said mower assembly, said input shaft extending in a direction generally parallel to the general direction of travel of said vehicle;
  a power takeoff shaft being driven by said power input means via said mower assembly and extending from said mower assembly in a direction opposite to and at an angle offset from the general direction of travel of said vehicle; and
  means for driving said horizontal shaft for rotation of said impeller, said means for driving being powered by said power takeoff shaft being located externally of said housing on said outer side thereof, said means for driving including a transmission shaft and a power receiving shaft, said power receiving shaft and a power receiving shaft, said power receiving shaft being connected to said power takeoff shaft by a universal joint and being connected to said transmission shaft by another universal joint, said power receiving shaft being generally parallel to said horizontal shaft, said means for driving said horizontal shaft further including means for belting the power receiving shaft to said horizontal shaft, said means for belting being arranged externally of said outer side of said housing, and
  wherein said housing further comprises a front and rear side and wherein said horizontal shaft has a free end positioned generally midway between the front and rear side of said housing, said inlet of said housing having a top and bottom side each positioned at a predetermined elevation, and said free end being positioned at a height between said predetermined elevations.

2. The terrain travelling vehicle as recited in claim 1, wherein said vehicle moves in a travel direction and wherein said horizontal shaft for driving said impeller is cantilevered from a plate of said housing, said plate forming said outer side of said housing, said horizontal shaft generally extending from said plate in a direction which is cross angled with respect to the travel direction of said vehicle, and wherein said blades of said impeller each being center-cut radiant blades having an inner edge facing said inlet of said housing, said inner edge flaring from a position proximate to said horizontal shaft to a position proximate to an end of said blade.

3. The terrain travelling vehicle as recited in claim 1, wherein said vehicle generally moves inn a travel direction and wherein said side of said deck having said opening has a front portion and a rear portion, said front portion being located forward of said rear portion with respect too said general direction of travel, said front portion being located further from the center of said deck than said rear portion such that said side of said deck is angled with respect to an axis parallel to said general direction of travel, and wherein said inner side of said housing is formed by an inner plate, said inner plate being attached to said side of said deck having said opening such that said housing is angled with respect to an axis parallel to said general travel direction as is said side of said deck.

4. The terrain travelling vehicle as recited in claim 1, wherein said housing has a curved plate between said inner side and said outer side and said outlet is positioned in said curved plate.

5. The terrain travelling vehicle as recited in claim 1, wherein said vehicle is a two axle, four wheel vehicle, two of said four wheels being front wheels and another two of said four wheels being rear wheels, said mower being located beneath said vehicle and between the front and rear wheels, said collection box being mounted at the rear of said vehicle, and said duct assembly being arranged at an upward slant from said outlet of said housing to said collection box.

6. The terrain travelling vehicle as recited in claim 1, wherein at least two mower cutters are provided side by side, one of said cutters being located slightly forward of said other cutter, said one of said cutters being directly coupled with said vertical shaft and said other cutter being driven by a belt transmission extending from said vertical shaft.

7. The terrain traveling vehicle as recited in claim 1, further comprising gauge wheels and limit gauge wheels for adjusting cutting length, said gauge wheels and limit gauge wheels being provided inn front of and behind the mower deck.

8. The terrain travelling vehicle as recited in claim 1, wherein said horizontal shaft for driving said impeller is mounted through said outer side of said housing by a bearing case mounted on said outer side, wherein said blades are mounted on a flange, said flange being in the shape of a truncated cone, and wherein said flange is mounted over a flange case.

* * * * *